(12) United States Patent
Taniuchi

(10) Patent No.: US 9,919,537 B2
(45) Date of Patent: Mar. 20, 2018

(54) METHOD FOR MANUFACTURING A PATTERN, MANUFACTURING APPARATUS FOR MANUFACTURING A PATTERN, METHOD FOR MANUFACTURING STRUCTURAL BODY AND MANUFACTURING APPARATUS THEREFOR

(71) Applicant: CANON KABUSHIKI KAISHA, Tokyo (JP)

(72) Inventor: Hiroshi Taniuchi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/104,928

(22) PCT Filed: Dec. 17, 2014

(86) PCT No.: PCT/JP2014/006284
§ 371 (c)(1),
(2) Date: Jun. 15, 2016

(87) PCT Pub. No.: WO2015/093050
PCT Pub. Date: Jun. 25, 2015

(65) Prior Publication Data
US 2016/0318313 A1 Nov. 3, 2016

(30) Foreign Application Priority Data

Dec. 18, 2013 (JP) .................................. 2013-261519

(51) Int. Cl.
*B41J 11/00* (2006.01)
*B32B 37/00* (2006.01)
(Continued)

(52) U.S. Cl.
CPC ............. *B41J 11/0015* (2013.01); *B05D 1/36* (2013.01); *B05D 5/00* (2013.01); *B29C 64/165* (2017.08);
(Continued)

(58) Field of Classification Search
CPC ........ B41J 2/0057; B41J 11/0015; B41J 2/01; B41J 2002/012; B41J 2/2114; B41J 29/38;
(Continued)

(56) References Cited

U.S. PATENT DOCUMENTS

2002/0105114 A1 8/2002 Kubo et al.
2012/0127250 A1* 5/2012 Kanasugi ............... B41J 2/0057
347/103
2013/0076843 A1 3/2013 Tombs

FOREIGN PATENT DOCUMENTS

CN 1990241 A 7/2007
CN 101421110 A 4/2009
(Continued)

*Primary Examiner* — Jannelle M Lebron
(74) *Attorney, Agent, or Firm* — Canon USA, Inc. I.P. Division

(57) ABSTRACT

A method of manufacturing a pattern includes providing a pattern of a first liquid and a movement-restraining liquid on a medium, the movement-restraining liquid configured to restrain the first liquid from moving on the medium, applying a powder material to the pattern, and removing the powder material not adhering to the pattern to form a pattern of the powder material.

14 Claims, 3 Drawing Sheets

(51) Int. Cl.
| | |
|---|---|
| B05D 1/36 | (2006.01) |
| B05D 5/00 | (2006.01) |
| B32B 37/24 | (2006.01) |
| B32B 38/10 | (2006.01) |
| B33Y 30/00 | (2015.01) |
| B41J 2/005 | (2006.01) |
| B33Y 10/00 | (2015.01) |
| B32B 37/12 | (2006.01) |
| B41M 5/00 | (2006.01) |
| B41J 2/01 | (2006.01) |
| B41J 2/21 | (2006.01) |
| C09D 11/322 | (2014.01) |
| C09D 11/40 | (2014.01) |
| C09D 11/54 | (2014.01) |
| B41J 2/14 | (2006.01) |
| B29C 64/165 | (2017.01) |

(52) U.S. Cl.
CPC ........ *B32B 37/025* (2013.01); *B32B 37/1292* (2013.01); *B32B 37/24* (2013.01); *B32B 38/10* (2013.01); *B33Y 10/00* (2014.12); *B33Y 30/00* (2014.12); *B41J 2/0057* (2013.01); *B41J 2/01* (2013.01); *B41J 2/14* (2013.01); *B41J 2/2114* (2013.01); *B41M 5/0017* (2013.01); *B41M 5/0047* (2013.01); *C09D 11/322* (2013.01); *C09D 11/40* (2013.01); *C09D 11/54* (2013.01); *B32B 2037/243* (2013.01); *B41J 2002/012* (2013.01)

(58) Field of Classification Search
CPC ...... B41J 2/14; B41M 5/0017; B41M 5/0047; C09D 11/322; C09D 11/54; C09D 11/40; C09D 11/30; C09D 11/02; B33Y 10/00; B33Y 30/00
USPC .................................. 347/20, 21, 101, 103
See application file for complete search history.

(56) References Cited

FOREIGN PATENT DOCUMENTS

| | | |
|---|---|---|
| CN | 102717584 A | 10/2012 |
| EP | 876914 A1 | 11/1998 |
| JP | 10-45138 A | 2/1998 |
| JP | 10-305488 A | 11/1998 |
| JP | 2002-321350 A | 11/2002 |
| KR | 10-2012-0053954 A | 5/2012 |
| RU | 2169222 C2 | 6/2001 |
| RU | 2370378 C1 | 10/2009 |
| WO | 86/05600 A1 | 9/1986 |
| WO | 98/05504 A1 | 2/1998 |
| WO | 2007/145378 A1 | 12/2007 |
| WO | 2011/097677 A1 | 8/2011 |
| WO | 2013/033273 A2 | 3/2013 |

* cited by examiner

[Fig. 1]
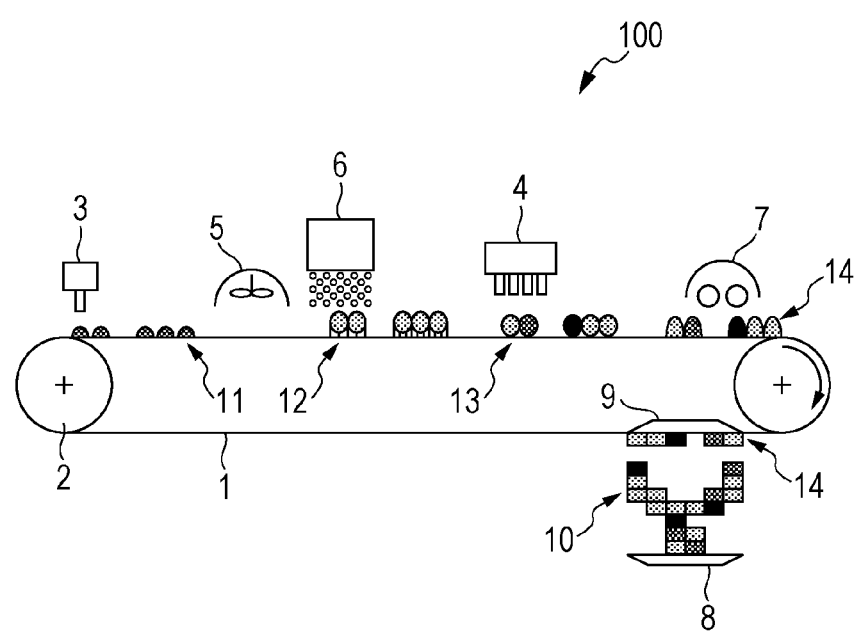

[Fig. 2]
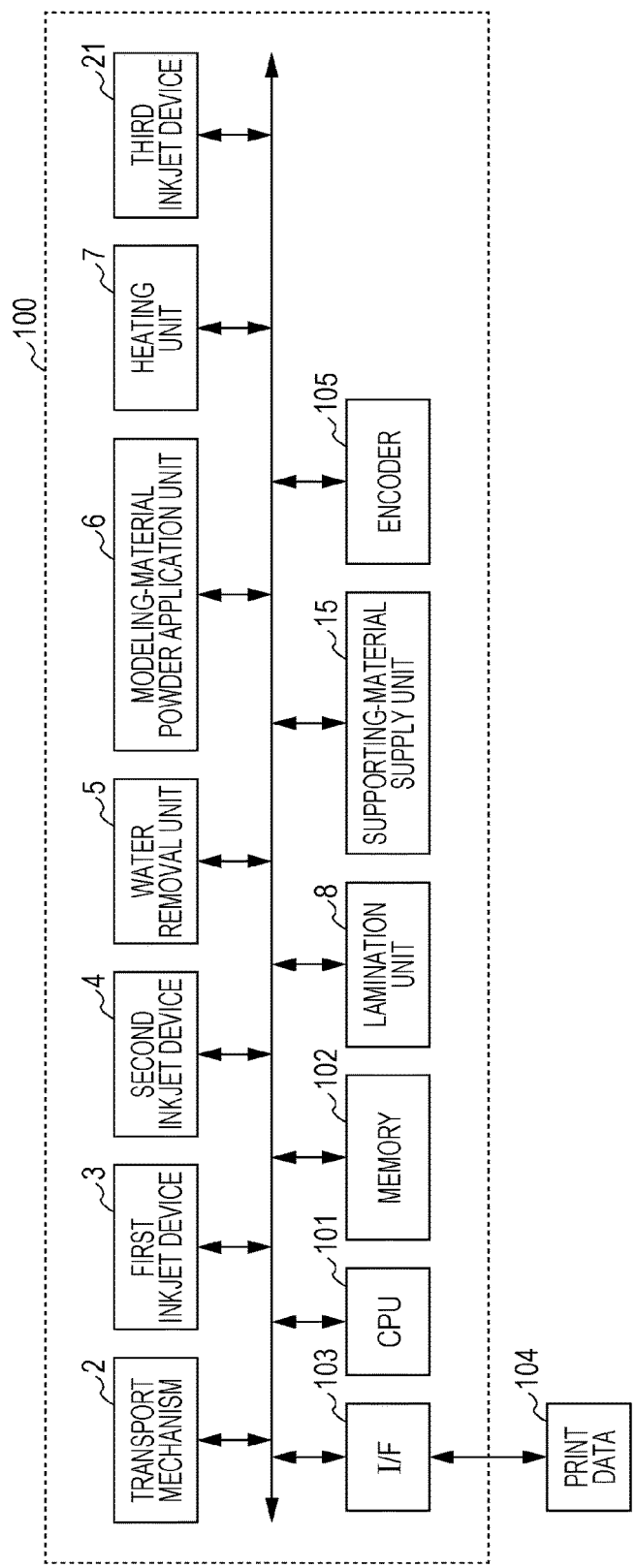

[Fig. 3]
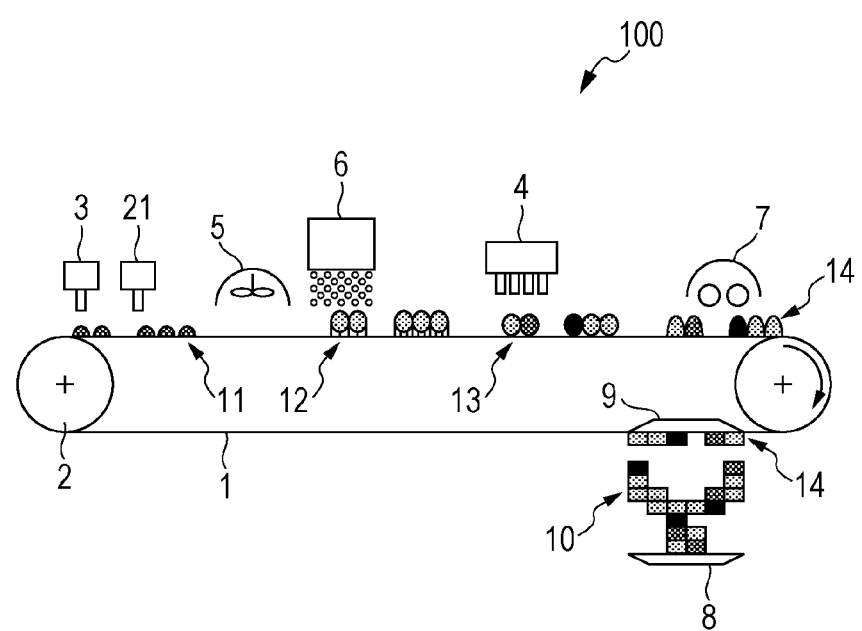

METHOD FOR MANUFACTURING A PATTERN, MANUFACTURING APPARATUS FOR MANUFACTURING A PATTERN, METHOD FOR MANUFACTURING STRUCTURAL BODY AND MANUFACTURING APPARATUS THEREFOR

TECHNICAL FIELD

The present invention relates to a method for manufacturing a pattern, a manufacturing apparatus for manufacturing a pattern, a method for manufacturing a structural body and a manufacturing apparatus therefor.

BACKGROUND ART

In recent years, digital print technology has become widespread. Because the digital print does not need a plate, it is easy to produce small quantity print jobs, and it is convenient for small quantity production on short notice. Digital print technology allows for the printing of general printed matter such as a photograph or magazine by analog print with approximately equal quality. However, problems for digital print technology remain with regard to thick film screen printing. There is the problem that the types of ink materials and recording media can be limited. There is much promise in the thick film screen printing, and thick film printing should allow for the printing of image information that is other than that of a normal printing. Therefore, with the thick film screen printing, it is important to have many choices of materials that can be used, such as the ink to form a pattern, and recording media. For example, screen-printing technology that uses analog thick film screen printing technology can form part of the print image thick film and raises design value, and can print electric circuits using conductivity ink. In contrast, a UV-IJ (ink-jet) method, which is known for digital print as a means for thick film screen printing, and the electronograph method, each limit the materials such as the ink that can be used to form a pattern. For example, the pattern formation materials are limited to photopolymers which an ink-jet method can eject if it is UV-IJ.

In thick film screen printing, it has been suggested to raise the degree of freedom of a material used for the pattern formation. According to Japanese Patent Laid-Open No. 10-305488 a method for thick film screen printing using ink has been disclosed in which a thermoplastic resin is applied on printed ink before the ink is dried and the thermoplastic resin is heated to melt the thermoplastic resin.

However, as the ink for ink-jet is typically of low viscosity, and as the ink drop ejected by a nozzle is typically absorbed in a recording medium immediately to prevent beading, it is difficult to have powder materials fix on the ink. Furthermore, even if it is possible to have powder materials fix on the ink, a big limitation is that it may be possible to make a pattern only on a recording medium having good ink absorbency.

CITATION LIST

Patent Literature

PTL 1: Japanese Patent Laid-Open No. 10-45138

SUMMARY OF INVENTION

Technical Problem

Accordingly, aspects of the present invention are directed to a method capable of manufacturing a pattern formed by powder on a medium, with high precision, that allows for pattern formation on a wide variety of different media.

In one aspect of the present invention, a method of manufacturing a pattern is provided that includes providing a pattern of a first liquid and a movement-restraining liquid on a medium, the movement-restraining liquid configured to restrain the first liquid from moving on the medium; applying a powder material to the pattern; and removing the powder material not adhering to the pattern to form a pattern of the powder material.

According to further exemplary embodiments of the present invention, there is provided a manufacturing apparatus for manufacturing a pattern.

Further features of the present invention will become apparent from the following description of exemplary embodiments with reference to the attached drawings.

Advantageous Effects of Invention

According to certain aspects of the prevent invention, a method can be provided that is capable of manufacturing a pattern formed by powder on a medium, with high precision, that allows for pattern formation on a wide variety of different media, and a manufacturing apparatus therefor can also be provided. Furthermore, a method for manufacturing a structural body by the aforementioned pattern formation and a manufacturing apparatus therefor can be provided.

BRIEF DESCRIPTION OF DRAWINGS

FIG. 1 is a schematic view showing a lamination forming apparatus as one example of a manufacturing apparatus realizing a method for manufacturing a structural body according to an embodiment.

FIG. 2 is a block diagram showing a control system of the lamination forming apparatus.

FIG. 3 is a schematic view showing a lamination forming apparatus as one example of a manufacturing apparatus realizing a method for manufacturing a structural body according to an embodiment.

DESCRIPTION OF EMBODIMENTS

Various exemplary embodiments, features, and aspects of the invention will be described in detail below with reference to the drawings.

FIG. 1 is a perspective view schematically showing a lamination modeling apparatus 100 as one example of a manufacturing apparatus realizing the method for manufacturing a pattern and the method for manufacturing a structural body by the pattern according to the embodiment of the present invention. In the apparatus 100, a pattern of a layer of the structural body which is to be newly laminated is formed on a surface of a belt-shaped transfer member 1 functioning as a transfer member, and is then allowed to pass through each process unit by a transport mechanism 2, so that a colored pattern 14 as a cross-sectional layer having a cross-sectional shape of the structural body is formed. In addition, the colored pattern 14 for the structural body is transported to a lamination position of a lamination unit 8 which is reciprocally moved relatively to the transfer member 1 and is then laminated on a laminated in-process structural body 10. Here, the transfer member 1 is used for an intermediate printing medium.

The transfer member 1 functions as a support member supporting a layer of the structural body formed on the surface, and also functions as a transfer member transferring a formed layer to an in-process structural body which is already formed by laminating layers to each other. Hence, the transfer member 1 is may be formed of a material having a high release property while having an affinity to some extent to a material for forming the structural body. For example, it is possible to form a structural body even if only a part of cross-sectional layer at a side of the transfer member 1 is transferred. But, for the sake of precision of structural body, it may be the case that the entire cross-sectional layer is transferred to the in-process structural body 10.

In addition, in order to stably perform the transfer, the transfer member 1 may have at least some elasticity. As ae material for the transfer member, for example, a silicone rubber and a fluorinated rubber may be mentioned. Since a material used for patterning may be repelled in some cases on those rubber materials mentioned above, it may be the case that a surface treatment is performed thereon in accordance with the material to be used. Although the rubber hardness is determined depending on the thickness of an elastic body, when the thickness thereof is large, a hard rubber may be preferably used, and when the thickness is small, a soft rubber may be preferably used. When the thickness is large, a rubber having a hardness of approximately 80 degrees may be provided, and when the transfer member 1 has a thin belt shape, a thin film formed of a rubber having a thickness of approximately 0.1 to 0.5 mm and a rubber hardness of approximately 50 to 20 degrees may be provided. When a high accuracy is required, a TEFLON (registered trademark) sheet and a smooth film coated with a release agent having a submicron-order thickness, each of which has no elasticity, may be used. In a case where a transfer member 1 having less elasticity is used, since machine accuracy and/or a long process time may be required in some cases, the material may be selected in accordance with the application purpose.

In addition, when a metal powder or the like is used as the shape forming material, the surface thereof is may be processed by a release treatment using boron nitride or the like having a high heat resistance.

A laminating production process performed in the lamination modeling apparatus 100 are described below. In the apparatus shown in FIG. 1, reaction liquid as a first liquid is ejected from a first inkjet device 3 on a transfer member 1 to form a pattern 11 of the reaction liquid on the transfer member 1. However, the method is not limited to that described above, and for example, a pattern of the reaction liquid may also be formed by printing using plate, such as for example flexographic printing. If a plurality of patterns of different images or different colors are formed at the same time in same area, then printing using a plate may be efficient to some extent. Likewise, for forming a structural body, arranging a plurality of patterns each having different shapes on a plate and then laminating the plurality of patterns may form the structural body.

Because a patterning using inkjet method can form a intended pattern shape with a liquid, it may be preferable. Various types of inkjet methods, thermal type, piezo actuator type, electrostatic type, and continuous type, are usable. With respect to nozzle through which ink is ejected, at least one of a one nozzle type, for example dispenser, and a line head provided with multi-nozzles, are usable. The line head may be preferably used for performing high productivity.

The first liquid is not limited to only the reaction liquid. A liquid such as for example a water-based ink, and/or an oil-based ink, can also be used as the first liquid. In the case of forming the pattern 11 by ejecting the first liquid on a print medium, it may be the case that the first liquid adhesiveness is kept until the powder materials arrive, so it may be the case that the water-based ink is used.

In case that plastic is used for the powder material and water-based ink is used for the first liquid, it may be the case that a water-soluble organic solvent and/or a surfactant is added into the water-based ink to let the water-based ink match with the plastic.

It may also be the case that water is evaporated from the applied ink as a first liquid comprising a water-soluble organic solvent and/or a surfactant to raise a density of the water-soluble organic solvent and/or a surfactant.

The water-soluble organic solvent used for the first liquid is not limited in particular. The water-soluble organic solvent may be selected with respect to surface tension, drying property, and viscosity, for example. As examples of the water-soluble organic solvent, for example, amides such as dimethylformamide and dimethylacetamide, ketones such as acetone, ethers such as tetrahydrofuran and dioxane, polyalkylene glycols such as polyethylene glycol and polypropylene glycol, alkylene glycols such as ethylene glycol, propylene glycol, butylenes glycol, triethylene glycol, 1,2,6-hexanetriol, thidiglycol, hexylene glycol and diethylene glycol, lower alkyl ethers of multivalent alcohols such as ethylene glycol methyl ether, diethylene glycol monomethyl ether and triethylene glycol monomethyl ether, monovalent alcohols such as ethanol, isopropyl alcohol, n-butyl alcohol and isobutyl alcohol, glycerin, N-methyl-2-pyrilidone, 1,3-dimethyl-2-imidazolidinone, triethanolamine, sulfolane and dimethyl sulfoxide can be named.

As the surfactant, fluorine-based surfactants, silicone-based surfactants, water-soluble anionic surfactants, cationic surfactants, nonionic surfactants, and ampholytic surfactants can be used.

With respect to the first liquid, a reaction ink that reacts with a second liquid applied to the powder material after supplying the powder material, as described below, when contacting with second liquid to restrain the second liquid from moving may improve the quality of the image formed by the second liquid.

A reaction type and reaction material may be selected with regard to the combination to be made with the second liquid, and according to an object of using the reaction. For example, for a water-based ink, it is possible to use agglutination, salting out appearance reaction, and/or acid-base reaction, alone or in combination. The agglutination may be suitable in them. In particular, a combination of pigment ink and reaction liquid including a metal salt may be provided with respect to image quality because that allows the formation of a thin ink pattern with a low amount of reaction liquid. And also, this combination may provide good because a reaction speed of this combination is high.

As a material for the reaction material contained in the reaction liquid, an ionic material having a charge that is the opposite of that of ink. For example, an anionic ink may be used as the ink for inkjet, and as reaction material for the anionic ink, a solution comprising a metal salt, in particular polyvalent metal salt solution having a valency of two or more, may be used. The polyvalent metal salt is consists of a polyvalent metal ion having a valency of two or more and anion corresponding to the polyvalent metal ion. As an example of the polyvalent metal ion, a divalent metal ion, such as for example $Ca^{2+}$, $Cu^{2+}$, $Ni^{2+}$, $Mg^{2+}$, $Zn^{2+}$ and trivalent metal ion, such as for example $Fe^{3+}$, $Al^{3+}$, can be named. And as example of the anion corresponding to that polyvalent metal ion, $Cl^-$, $NO^{3-}$, $SO_4^{2-}$, $I^-$, $Br^-$, $ClO^{3-}$, $RCOO^-$ (where R is a alkyl group) can be named.

It is useful to use the metal ion with acid for higher reactivity. The acid is also useful as the reaction material alone.

As examples of the acid, an organic acid, for example, oxalic acid, polyacrylic acid, formic acid, acetic acid, propionic acid, malonic acid, malic acid, maleic acid, ascorbic acid, succinic acid, glutaric acid, glutaminic acid, fumaric acid, citric acid, tartaric acid, lactic acid, pyrrolidone carboxylic acid, pyrone carboxylic acid, pyrrol carboxylic acid, furancarboxylic acid, coumaric acid, thiophencarboxylic acid, nicotinic acid, hydroxysuccinic acid, dioxysuccinic acid can be raised.

The first liquid may comprise a solid component, and a containing ratio in a colored pattern (described below) may be higher with decreasing solid component in the first liquid. The high containing ratio in the colored pattern effects hardness of the structural body formed by the colored pattern and makes recycling of the structural body easy.

In addition, because an amount of powder materials to be provided is in proportion to the thickness of the first liquid, with respect to the uniformity of the thickness of the layer to be formed by the powder, it may be the case that it is provided so that the thickness of the first liquid on transfer member 1 becomes uniform. The layer to be formed by the powder material having uniformity in the thickness contributes to aesthetically good features of the printed product formed by the layer, and also contributes to precision in forming the structural body formed by the layer.

Because the first liquid has a low effect on the image to be formed, because of the second liquid applied to the powder material, with respect to a color of the first liquid, it may be the case that it is provided so that the first liquid has transparency or no color. The color of the first liquid can be white.

To get uniform thickness for the layer to be formed by the powder material, the powder material may be selected according to a classification to a predetermined size, and in a range showing adhesive for power.

The thickness of the pattern 11 of the first liquid can also be adjusted using an additional mechanism, such as a water removal unit 5 shown in FIG. 1. The first liquid may be a combination of multiple liquids, rather than a single liquid. If inkjet is used, it is also possible to use a material composed of two liquids that react with each other for higher viscosity because the viscosity of liquids that can be ejected is limited.

The pattern 11 of the first liquid can be stabilized by using a first liquid composed of multiple liquids. For example, when the recording medium is a surface with no ink absorbency or an ink-repelling surface of the transfer member 1, it can be assumed that the ink pattern 11 moves from the intended position between the formation of the pattern 11 of the first liquid and the supply of the powder material. Since the powder material is applied in accordance with the pattern 11 of the first liquid, the quality of thick film images is of concern in such a case. In particular, when water removal is performed for the purpose of making the thickness of the pattern 11 of the first liquid smaller, changes in the pattern 11 of the first liquid due to a decrease in volume associated with the drying of the pattern 11 can be significant, depending on the characteristics of the recording surface. Even when water removal is not performed, there is the fear of the pattern 11 of the first liquid being deformed by surface tension or the like if a long time elapses between the application of the first liquid and the supply of the powder material.

To prevent the ink from being repelled on the recording surface in this way, the first liquid may be, for example, a combination of two liquids, a reaction liquid and a liquid that restrains the reaction liquid from moving (a reaction-liquid movement-restraining liquid). More specifically, the movement of the reaction liquid can be restrained by using a colorless or achromatic ink having a charge that is the opposite of that of the reaction liquid before the supply of the powder material, and can also be restrained by applying some or all of a colored ink as a second liquid (described below) immediately after the application of the reaction liquid. When the reaction-liquid movement-restraining liquid is clear or in an inconspicuous light color, it may be the case that the reaction-liquid movement-restraining liquid is applied to the section not to be colored.

When a colored ink is used as a reaction-liquid movement-restraining liquid, the colored ink reacts with the reaction liquid, thereby restraining the movement of the reaction liquid. For example, it may be the case that a certain amount of a colored ink is applied to the section to be colored while additional ink is ejected from a second inkjet device 4 (described below) to the section where a deep-color image is finally formed. During this, it is possible to apply a clear reaction-liquid movement-restraining liquid to any section within the pattern 11 of the reaction liquid other than the section to be colored.

A time-based guideline is that when the powder material is supplied after an interval of several seconds or several tens of seconds from the formation of the pattern 11 of the first liquid, the first liquid may be composed of a combination of a reaction liquid and a reaction-liquid movement-restraining liquid.

The timing interval between the application of the reaction liquid and the reaction-liquid movement-restraining liquid may be within several seconds, preferably within 1 second, depending on the compatibility between the recording surface and the reaction liquid.

When the first liquid is composed of multiple liquids, it is likely that the pattern 11 of the liquid is thicker than in a case where the first liquid is formed by a single liquid, and thus the powder material may be supplied after the thickness of the pattern 11 of the first liquid is reduced using a water removal unit or allowed to decrease with time. As for the composition of the reaction-liquid movement-restraining liquid, it may be such that the thickness of the pattern 11 can be reduced through a water removal process after application, and may be such that the solid content of the liquid is small. However, the volume to be applied and the viscosity can be considered in determining the solid content so that the applied volume is not too large and that ejection can be stably performed.

Some guidelines on viscosity and solid content are that the viscosity can be 100 mPa·s or less, preferably 50 mPa·s or less, more preferably 20 mPa·s or less and that the solid content can be 20% or less, preferably 10% or less, more preferably 5% or less, although the range of suitable values depends on the materials used, the shape to be modeled, and the accuracy of modeling.

A guideline on the thickness of the pattern 11 of the first liquid at the application of the powder material is that the thickness can be 20% or less of the diameter of the particles of the powder material applied, preferably 10% or less, more preferably 5% or less.

To supply the reaction-liquid movement-restraining liquid, equipment capable of placing liquid drops at their intended positions in a noncontact manner, such as an inkjet device or a jet-type dispenser, may be used.

An example of an apparatus for use with the first liquid as a combination of multiple liquids is shown in FIG. 3. In FIG. 3, the apparatus has a third inkjet device 21 configured to apply a reaction-liquid movement-restraining liquid separate from the first inkjet device 3. The other details are the same as in FIG. 1. Although the first liquid in FIG. 3 is provided by two inkjet devices, the first liquid can also be provided by two or more devices using two or more liquids. The function of the first liquid in the process is to attach a powder material, which means that the quality of the first liquid (e.g., adhesive force and pattern accuracy) can be improved. Naturally, the first inkjet device 3 shown in FIG. 1 may be configured to play the role of the third inkjet device 21 in FIG. 3 by ejecting both a reaction liquid and a liquid that restrains the reaction liquid from moving.

As for the order of application of the reaction liquid and the reaction-liquid movement-restraining liquid, whichever liquid can be applied first.

Then a powder material is applied using a modeling-material powder application unit 6 to the pattern 11 of the first liquid transported to the position of the modeling-material powder application unit 6. This forms a powder pattern 12. Since the fixation of the powder material is achieved by the adhesive force of the first liquid, a wide variety of different materials can be used as long as they can be granulated. Materials such as thermoplastic resin may be used to help to finally melt the applied particles into a single mass. For example, thermoplastic resins such as polyethylene, polypropylene, nylon, ABS, polylactic acid, polystyrene, polyvinylchloride, polymethyl methacrylate, polytetrafluoroethylene, ionomers, and EVA can be used. In addition to resins, materials that can be shaped by thermoforming, such as metals, glass, and ceramics, can be used. Furthermore, the surface of the powder may be subjected to a surface treatment that helps the powder adhere to ink, the ink develop color, and the particles become fixed together. Although the shape of the particles is not particularly limited either, a globular shape helps the particles adhere to the image section (the section where the image is to be formed) and to remove the particles from the non-image section (the section where the image is not to be formed). Uniform thickness of the finished pattern 12 can be ensured through well-ordered arrangement of particles into one layer, and this is facilitated when the particles are similar in size. Naturally, the thickness of the pattern 12 increases with increasing particle size, and the use of a material with a different particle diameter is a way to control the thickness of the pattern 12.

Making the inner structure of the particles porous can lead to improved color development of ink. No limitations are placed on how the modeling-material powder application unit 6 applies the powder, and a possible way is to supply the powder material, by spraying or allowing it to flow, to at least the entire pattern 11 of the first liquid on the transfer member 1 and then remove the powder material by techniques such as vibration, blowing air, and aspiration except in the section where the powder material is fixed by the first liquid. It is also possible to create a tentative pattern of the powder in advance using a separate technique, such as static electricity, and then partially supply the powder in accordance with the pattern 11 of the first liquid. The application and removal of the modeling material can be performed in separate processes, and can also be conducted simultaneously in a single process. For example, blowing air toward the pattern 11 of the first liquid while spraying the particles of the structural material on the blown air is a way of simultaneous processing for the formation of the powder pattern 12 and the removal of unnecessary powder.

It is also possible to use multiple powder materials. For example, the first liquid is applied to the section where a first powder material is to be placed, and a pattern of the first powder is formed there. Then a pattern of the first liquid is formed again in the section where a second powder material is to be placed, and the second powder is attached thereto. Such an approach allows multiple materials to be placed in the same plane for purposes such as partial modification of the hardness of the image pattern or structural body.

Then the second inkjet device 4 applies a colored ink as the second liquid to the powder pattern 12 to form a colored powder pattern 13, which is a pattern of a colored powder. Although FIG. 1 illustrates a structure in which a color ink is applied from a second inkjet device 4, this is not the only possible structure. However, inkjet is very useful because it allows the second liquid to be applied to the powder pattern 12 without the unit configured to apply the liquid, i.e., the second inkjet device 4, coming into contact with the transfer member 1. In particular, when it is a prerequisite that patterns formed using powder particles be transferred to and laminated on an in-process structural body 10 (described below), the transfer member 1 and the powder particles cannot be firmly fixed together. However, contact recording can cause back-trapping of the particles.

The limitations placed on the second inkjet device 4 are the same as those for the aforementioned first inkjet device 3, which means that in an inkjet method, the second inkjet device 4 can be used without particular limitations.

The ink as the second liquid, which is not limited in particular, is basically a color ink with a high decorating effect. Both a water-based ink and an oil-based ink can be used, and a water-based ink may be used for the sake of reaction with the first liquid. The ionic reaction available with a water-based ink is so fast that the image can be reproduced with few irregularities. In particular, an ink set in which the second liquid is a water-based ink comprising a pigment ink and the first liquid is a solution comprising a metal salt may be used in this embodiment.

When a pigment ink is used, additives such as dispersion resin, dispersion aids, water-soluble organic solvents, pH adjusting agents, surfactants, and water can be added to control characteristics besides the pigment as coloring material. As for the mixing ratio between the individual materials, the materials can be mixed as appropriate for the image to be printed and the reaction liquid to be used. A guideline is as follows: pigment, 1% to 10%; a water-soluble organic solvent, 5% to 30%; water, 70% to 90%; other materials, several percentage points or less.

Even when the second liquid is a set of multiple color inks, the use of a reaction liquid as the first liquid prevents color mixing, ensuring that a high-quality image is formed. Furthermore, differences in volume between the applied inks do not affect the amount of the powder attached because the powder has already been formed into a pattern using the first liquid.

Forming the colored powder pattern 13 in this way, by applying a first liquid, a powder material, and a second liquid in this order to the transfer member 1, offers some other advantages. For example, in a method where a layer formed from the colored powder pattern 13 is transferred to something else, using a reaction liquid as the first liquid and applying the second liquid before the powder material would cause difficulty in releasing the image pattern as a result of the reaction acting on the transfer member 1. On the other hand, applying the materials in the order mentioned in this embodiment ensures that the reaction acts more on the powder material than on the transfer member 1, thereby preventing a decrease in transfer efficiency and making the fixation between the ink pattern and the powder material firmer. Furthermore, the adhesiveness given to the top surface of the powder material allows film of powder resin to be formed after transfer to a recording medium. As a result, benefits arise to the degree of freedom in selecting the material for the transfer member 1 and the longevity of the transfer member 1 as well as accuracy (thermal expansion) and productivity.

Furthermore, following the order mentioned in this embodiment allows layers formed from colored powder patterns 13 to be uniformly colored on the lateral surfaces thereof, thereby offering the great advantage of natural color development on the lateral surfaces of the resulting structural body.

The colored powder pattern 13 formed by the patterns of the first liquid, the powder material, and the second liquid on the belt-shaped transfer member 1 is then transported to the position for heating where it is heated by the heating unit 7. At this position, the heating unit 7 emits heat radiation to the colored powder pattern 13 to form the colored powder pattern 13 into film. No particular limitations are placed on how the heating unit 7 heats the pattern 13. For example, contact methods such as heating rollers can be used, and noncontact methods such as irradiation with IR or microwaves can also be used. It is also possible to heat the pattern 13 by scanning it with energy radiation, such as laser light. The heating unit 7 may be disposed on the back surface of the transfer member 1.

The colored powder pattern 13 can also be formed into film by photocuring a photocurable component, such as an ultraviolet-curable component, added in advance to a material used to form the pattern 13. In this case, the colored powder pattern 13 may be irradiated with curing light while in contact with a recording medium or the in-process structural body 10 so that the pattern 13 is transferred and bonded at the same time.

A colored pattern 14 formed from the colored powder pattern 13 in this way is transported to the position where it faces a lamination unit 8, aligned with the lamination unit 8, and then brought into contact with an in-process structural body 10. The colored pattern 14 is cooled while in contact with the in-process structural body 10 so that the colored pattern 14 adheres to the in-process structural body 10. It is also possible to first cure the colored pattern 14 by cooling it and then make the cured layer adhere to the in-process structure 10 using adhesive or the like. During this process, a back plate 9 provided on the back surface of the transfer member 1 is used to make the colored pattern 14 adhere to the structural body 10.

Although the apparatus shown in FIG. 1 forms film of a powder material by melting the material on a transfer member 1, it is also possible to transfer the powder material to a recording medium after the application of the second liquid and then form the transferred material into film on the recording medium. Indeed, this can lead to firmer adhesion to the recording medium, depending on the combination of the first and second liquids, the powder material, and the recording medium.

Furthermore, the powder material may remain in the form of particles in the finished article, rather than being melted.

Although not shown in FIG. 1, forming an overhang shape by a lamination modeling method generally requires a temporary supporting member that is called a support, and a support may optionally be formed as appropriate for the materials used and the intended use of the structural body. In this case, the lamination modeling apparatus has a supporting-material supply unit, and the supporting-material supply unit (not shown in the drawing) supplies a supporting material configured to form a supporting member that supports the in-process structural body 10.

These processes are repeated a predetermined number of times to manufacture a structural body.

FIG. 2 is a diagram showing a control system for the lamination modeling apparatus 100 in FIGS. 1 and 3. In the lamination modeling apparatus 100, reference numeral 100 denoting the entire apparatus, a CPU 101 is the main unit responsible for the control of the entire system and controls the individual components. A memory 102 is composed of ROM storing operating programs for the CPU 101, RAM used to store print data 104 loaded through an interface 103 and for work to process the data, and so forth.

In response to a signal to start printing, the CPU 101 converts the loaded print data 104 as data of the structure to be formed into slice data for actual patterning in accordance with predetermined parameters. Then out of the slice data, information defining the entire area where the inks should adhere is transmitted to the first inkjet device 3, and information defining the area where a colored ink should be applied is transmitted to the second inkjet device 4. Furthermore, information concerning the application of a reaction-liquid movement-restraining liquid, optionally together with information concerning a colored ink, is transmitted to the third inkjet device 21. At the same time, the CPU 101 communicates with the transport mechanism 2, the first inkjet device 3, the second inkjet device 4, the modeling-material powder application unit 6, the heating unit 7, the lamination unit 8, and the supporting-material supply unit 15 to check the status thereof. If these components are found ready to start printing, the transport mechanism 2 transports the transfer member 1. After the transfer member 1 is positioned in accordance with a signal from an encoder 105, the first inkjet device 3, the second inkjet device 4, the water removal unit 5, the modeling-material powder application unit 6, the heating unit 7, and the lamination unit 8 operate as designed. This process is repeated a predetermined number of times to complete a structural body.

In the following, an aspect of the present invention is described in more detail by showing some examples.

Example 1

Lamination modeling was performed using the apparatus in FIG. 3.

The object data was converted into slice data with an intended interslice gap in advance. In Example 1, 100-micrometer gap slice data was used.

A piece of 0.4-mm PET film with polyimide tape (3M; trade name, 5419) on its surface was used as the transfer member 1.

Then a reaction liquid capable of preventing color mixing between different inks (formula shown below) was applied using the first inkjet device 3 to the positions corresponding to the pattern 11 to be formed.

Formula of the Reaction Liquid
$Ca(NO_3)_2 \cdot 4H_2O$: 50 parts by mass
Surfactant (Kawaken Fine Chemicals; trade name, Acetylenol EH): 1 part by mass
Diethylene glycol: 9 parts by mass
Purified water: 40 parts by mass Then a reaction-liquid movement-restraining liquid (formula shown below; viscosity, 2.1 mPa·s) was applied using the third inkjet device 21 to the formed pattern 11 of the reaction liquid.

Reaction-Liquid Movement-Restraining Liquid
  Titanium oxide (Ishihara Sangyo Kaisha; trade name, TTO-55): 3 parts by mass
  Styrene-acrylic acid-ethyl acrylate copolymer (acid value, 240; weight-average molecular weight, 5000): 1 part by mass
  Glycerin: 10 parts by mass
  Ethylene glycol: 5 parts by mass
  Surfactant (Kawaken Fine Chemicals; trade name, Acetylenol EH): 1 part by mass
  Purified water: 80 parts by mass Then the pattern 11 formed on the transfer member 1 in this way was dried using the water removal unit 5.

Then polypropylene particles (average particle diameter, 200 micrometers) as the powder material were applied using a blade coater as the modeling-material powder application unit 6 to the dried ink pattern 11 on the transfer member 1.

Then air was blown over the transfer member 1 using a commercially available antistatic air blower (initial pressure, 0.25 Pa) to remove out-of-pattern powder material.

The obtained powder pattern 12 was colored by applying color inks having the formula below using the second inkjet device 4, forming a colored powder pattern 13.

Composition of the Inks
  Pigment (listed below): 3 parts by mass
  Black, carbon black (Mitsubishi Chemical; trade name, MCF88); cyan, pigment blue 15; magenta, pigment red 7; yellow, pigment yellow 74
  Styrene-acrylic acid-ethyl acrylate copolymer (acid value, 240; weight-average molecular weight, 5000): 1 part by mass
  Glycerin: 10 parts by mass
  Ethylene glycol: 5 parts by mass
  Surfactant (Kawaken Fine Chemicals; trade name, Acetylenol EH): 1 part by mass
  Purified water: 80 parts by mass Then the colored powder pattern 13 was heated using a heater from the back surface of the transfer member 1 and melted at approximately 170 degrees (Celsius) into a colored pattern 14.

Then the colored pattern 14 was transported to the position of the lamination unit 8 and positioned, and then the modeling stage of the lamination unit 8 was moved down to the point where the gap from the surface of the transfer member 1 was 100 micrometers so that the colored pattern 14 came into contact with the surface of the modeling stage.

This series of operations was repeated, stacking new layers on an old laminate, a total of 1000 times to complete a laminate with a height of 10 cm. In this way, a three-dimensional structural body was obtained.

Although in the above example a structural body was formed by laminating cross-sectional layers obtained from colored powder patterns, it is also possible to print a circuit board as a thick film printed matter by applying a first liquid, a powder material, and a second liquid in this order to a recording medium as described in Example 2 below.

Example 2

An example of performing thick film printing using the pattern formation section of the apparatus in FIG. 3 is shown.

A circuit pattern (circuit line width, 0.2 mm) was directly drawn on an epoxy resin plate for electric boards (thickness, 1 mm; a commercially available product) with the reaction liquid below using the first inkjet device 3.

Formula of the Reaction Liquid
  $AlK(SO_4)_2 \cdot 12H_2O$: 40 parts by mass
  Styrene-acrylic acid-ethyl acrylate copolymer (acid value, 270; weight-average molecular weight, 1500): 3 parts by mass
  Surfactant (Kawaken Fine Chemicals; trade name, Acetylenol EH): 1 part by mass
  Diethylene glycol: 13 parts by mass
  Purified water: 43 parts by mass Then a reaction-liquid movement-restraining liquid (formula shown below; viscosity, 3.0 mPa·s) was applied using the third inkjet device 21 to the formed pattern 11 of the reaction liquid.

Reaction-Liquid Movement-Restraining Liquid
  Titanium oxide, $TiO_2$ (rutile-type): 5 parts by mass
  Resin, styrene-ethyl acrylate copolymer (acid value, 220; average molecular weight, 5000): 2 parts by mass
  Ethylene glycol: 4 parts by mass
  Ethyl alcohol: 4 parts by mass
  Surfactant (Kawaken Fine Chemicals; trade name, Acetylenol EH): 1 part by mass
  Purified water: 84 parts by mass Then the obtained pattern 11 of the reaction liquid was dried with warm air at 50 degrees (Celsius) from the water removal unit 5 for 5 minutes. Then solder balls (diameter, 20 micrometers; a commercially available product) were applied to the pattern 11 of the reaction liquid using the modeling-material powder application unit 6, and the board was vibrated to remove out-of-pattern solder balls.

Then the colored inks below were applied to the obtained pattern 12 of solder balls using the second inkjet device 4 in such a manner that the lines intended for use as 5-V lines were colored red (for plus side) and black (for minus side), and the lines intended for use as 2.5-V lines blue (for plus side) and yellow (for minus side).

Formula of the Inks
  Pigment: 10 parts by mass
  Black: $CuO \cdot Cr_2O_3$
  Blue: $CoO \cdot Al_2O_3$
  Red: $CdS \cdot 3CdSe$
  Yellow: CdS
  Clear: No pigment
  Resin, styrene-ethyl acrylate copolymer (acid value, 220; average molecular weight, 5000): 2 parts by mass
  Ethylene glycol: 4 parts by mass
  Ethyl alcohol: 4 parts by mass
  Surfactant (Kawaken Fine Chemicals; trade name, Acetylenol EH): 1 part by mass
  Purified water: 79 parts by mass The clear ink contained purified water instead of pigment.

Then this patterned board was heated in a heating furnace at 220 degrees (Celsius) for 5 minutes. The solder balls were melted, and a circuit board color-coded by the service voltage was obtained.

Example 3

An example of performing thick film printing using the pattern formation section of the apparatus in FIG. 3 is shown.

A scenic photographic image including a high-density section, the volume of applied ink ranging from 0% to 240%, was used as image data. This is an example where both the first liquid and the second liquid comprised a colored ink so that the high-density section could be colored.

The reaction liquid below was uniformly applied using the first inkjet device 3 to the section of a white glass plate (thickness, 1 mm; a commercially available product) where the photographic image should be produced as thick film, making 11% volume. Then the six colored inks below (clear ink for the clear thick film section) were sequentially applied in accordance with the image data, with the upper limit of the total volume of inks being 100%. In this way, a pattern 11 of the first liquid was produced.

In Example 3, the application of one 4-pl drop to each point at a resolution of 1200 dpi is defined as a volume of applied ink of 100%.

Formula of the Reaction Liquid
$Ca(NO_3)_2 \cdot 4H_2O$: 50 parts by mass
Surfactant (Kawaken Fine Chemicals; trade name, Acetylenol EH): 1 part by mass
Diethylene glycol: 9 parts by mass
Purified water: 40 parts by mass
Composition of the Inks
Pigment (listed below): 3 parts by mass
Black, carbon black (Mitsubishi Chemical; trade name, MCF88); cyan, pigment blue 15; magenta, pigment red 7; yellow, pigment yellow 74; white, titanium oxide; clear, silica-based fine particles
Styrene-acrylic acid-ethyl acrylate copolymer (acid value, 240; weight-average molecular weight, 5000): 1 part by mass
Diethylene glycol: 10 parts by mass
Ethylene glycol: 5 parts by mass
Surfactant (Kawaken Fine Chemicals; trade name, Acetylenol EH): 1 part by mass
Purified water: 80 parts by mass Then the obtained pattern 11 of the first liquid was dried with warm air at 50 degrees (Celsius) from the water removal unit 5 for 5 minutes, and polypropylene particles (average particle diameter, 200 micrometers) as the powder material were sprayed onto the pattern 11 of the first liquid.

Then air was blown over the transfer member 1 using a commercially available antistatic air blower (initial pressure, 0.25 Pa) to remove the powder material existing outside the pattern 11 of the first liquid. In this way, a powder pattern 12 was obtained.

Then the color inks having the above formula were applied using the second inkjet device 4 to the section where the intended total volume of inks was not reached with the first liquid (the section where the intended volume of applied ink was in the range of 100% to 240%). In this way, a colored powder pattern 13 was obtained.

Then the colored powder pattern 13 was heated using a heater from the back surface of the transfer member 1 and melted at approximately 170 degrees (Celsius) into a colored pattern 14.

In this way, a thick film printed photographic image including fine and high-density image was obtained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-261519, filed Dec. 18, 2013, which is hereby incorporated by reference herein in its entirety.

The invention claimed is:

1. A method of manufacturing a pattern, the method comprising:
    applying ink and reaction liquid comprising a compound which reacts to a compound in the ink, according to image data representing an image, to form an ink pattern having a shape of the image formed by the ink combined with the reaction liquid on a transfer member;
    reducing solvent content of the ink pattern;
    applying a thermoplastic resin powder to the ink pattern of which solvent content has been reduced;
    removing the thermoplastic resin powder not adhering to the ink pattern to form a pattern of the thermoplastic powder;
    heating the formed pattern of the thermoplastic resin powder to melt the thermoplastic resin powder in the formed pattern on the transfer member, thereby forming a melted resin pattern, and
    bringing a layer formed of the melted resin pattern on the transfer member into contact with a previously stacked layer formed of the pattern of the thermoplastic resin powder to form a structural body.

2. The method according to claim 1 of manufacturing a pattern, the method further comprising applying a color ink to the pattern of the thermoplastic resin powder by an inkjet method.

3. The method according to claim 1 of manufacturing a pattern, wherein the ink is a clear ink.

4. The method according to claim 1, wherein the transfer member is a belt-shaped transfer member configured to rotate such that the melted resin pattern reaches a transferring member.

5. The method according to claim 1 of manufacturing a pattern, wherein the ink is a color ink.

6. The method according to claim 5 of manufacturing a pattern, wherein the color ink is a pigment ink, and the reaction liquid comprises a metal salt configured to act on the pigment ink.

7. The method according to claim 5 of manufacturing a pattern, wherein the color ink is applied after the reaction liquid is applied.

8. A manufacturing apparatus for manufacturing a pattern, the manufacturing apparatus comprising:
    a transfer member;
    a formation unit configured to form an ink pattern formed by ink combined with reaction liquid comprising a compound which reacts to a compound in the ink on the transfer member, by applying the ink and the reaction liquid to the transfer member according to image data representing an image;
    a reducing unit configured to reduce solvent content of the formed pattern by the formation unit;
    an application unit configured to apply a thermoplastic resin powder to the ink pattern provided by the formation unit;
    a removal unit configured to remove the thermoplastic resin powder applied by the application unit and not adhering to the ink pattern;
    a heating unit configured to heat the thermoplastic resin powder to melt the thermoplastic resin applied on the ink pattern after removing the thermoplastic resin powder not adhering to the ink pattern by the removal unit, thereby forming a melted resin pattern; and
    a stacking unit configured to stack a first layer formed of the melted resin pattern on the transfer member on a previously stacked layer formed of the melted resin pattern to bring the first layer into contact with the previously stacked layer to form a structural body.

9. The manufacturing apparatus according to claim 8, further comprises an applying unit configured to apply a color ink to the thermoplastic resin powder by an inkjet method.

10. The manufacturing apparatus according to claim 8, wherein the ink is a clear ink.

11. The manufacturing apparatus according to claim 8, wherein the transfer member is a belt-shaped transfer member configured to rotate such that the melted resin pattern reaches a transferring member.

12. The manufacturing apparatus according to claim 8, wherein the ink is a color ink.

13. The manufacturing apparatus according to claim 12, wherein the color ink is a pigment ink, and the reaction liquid comprises a metal salt configured to act on the pigment ink.

14. The manufacturing apparatus according to claim 12, wherein the formation unit forms the ink pattern by applying the color ink after the reaction liquid is applied to the transfer member.

* * * * *